US006693931B1

(12) United States Patent
Mendenhall et al.

(10) Patent No.: US 6,693,931 B1
(45) Date of Patent: Feb. 17, 2004

(54) METHOD AND SYSTEM FOR PHASE STABILIZATION

(75) Inventors: Marcus H. Mendenhall, Nashville, TN (US); Gary R. Shearer, Murfreesboro, TN (US)

(73) Assignee: Vanderbilt University, Nashville, TN (US)

( * ) Notice: Subject to any disclaimer, the term of this patent is extended or adjusted under 35 U.S.C. 154(b) by 0 days.

(21) Appl. No.: 10/329,520

(22) Filed: Dec. 27, 2002

(51) Int. Cl.[7] .................................................. H01S 3/13

(52) U.S. Cl. .............................. 372/29.023; 372/29.02; 372/29.016; 372/33

(58) Field of Search .......................... 372/29.023, 29.02, 372/29.016, 33

(56) References Cited

U.S. PATENT DOCUMENTS

| | | | | | |
|---|---|---|---|---|---|
| 4,768,181 | A | * | 8/1988 | Ichinose et al. | 369/53.36 |
| 5,059,987 | A | * | 10/1991 | Takeyama et al. | 347/247 |
| 5,574,588 | A | * | 11/1996 | Kawanishi et al. | 359/158 |
| 5,706,113 | A | * | 1/1998 | Kawanishi et al. | 359/158 |
| 6,020,773 | A | * | 2/2000 | Kan et al. | 327/271 |
| 6,331,991 | B1 | * | 12/2001 | Mahgerefteh | 372/33 |
| 6,473,255 | B2 | * | 10/2002 | Hatanaka et al. | 360/51 |
| 2001/0024458 | A1 | * | 9/2001 | Fermann | 372/6 |
| 2002/0168161 | A1 | * | 11/2002 | Price et al. | 385/123 |
| 2003/0156605 | A1 | * | 8/2003 | Richardson et al. | 372/25 |

* cited by examiner

*Primary Examiner*—Leon Scott, Jr.
(74) *Attorney, Agent, or Firm*—Cooley Godward, LLP

(57) ABSTRACT

The invention relates to an improved method and system for synchronizing signals in a particle accelerator system. In one embodiment, a method and system is disclosed whereby a phase of laser pulses are monitored, and a high-frequency signal is adjusted as necessary to be substantially in-phase with the laser pulses. In another embodiment, a method and system is disclosed whereby a phase of an electromagnetic field in an electron gun is monitored, and a high-frequency signal is adjusted as necessary to be substantially in-phase with the electromagnetic field.

46 Claims, 5 Drawing Sheets

100

100

METHOD AND SYSTEM FOR PHASE STABILIZATION

STATEMENT OF GOVERNMENT SUPPORT

This invention was made with government support under Grant No. N00014-99-1-904 awarded by the Office of Naval Research. The US Government may have certain rights in the invention as a result of this support.

BACKGROUND OF THE INVENTION

1. Field of the Invention

The invention relates to the use and operation of particle accelerator systems. More specifically, the invention relates to techniques for synchronizing signals within a particle accelerator system such that a stable, reliable and predictable output is obtained from the particle accelerator system.

2. Description of the Related Art

Conventional particle accelerator systems serve to manipulate and control atomic and sub-atomic particles through the use of electromagnetic fields. For example, some particle accelerators are used to cause the collision of atomic particles (with one another or with a separate object), so that sub-atomic particles can thereby be obtained. As another example, particle accelerators can be used as part of systems designed to produce high-energy, coherent light sources (e.g., the Free Electron Laser (FEL), which uses an electron beam as its lasing medium).

In accelerator systems operating to create an electron beam having desired properties, electrons can be obtained from a radio-frequency (RF) photocathode electron gun. Such a photocathode electron gun typically requires a pulse of (laser) light to be provided to the cathode at a time that is very precisely determined with respect to the phase of the electromagnetic field inside the resonant cavity of the electron gun. This phase of the field within the cavity is conventionally approximated by using the phase of the RF drive applied to the gun, as will be discussed in more detail below.

Providing the laser pulse to the photocathode at the appropriate time is typically accomplished by driving the source laser with an RF source (i.e., frequency generator) carefully phase-locked to a higher-frequency RF drive being applied to the electron gun (as well as to the accelerator itself). This technique, using common lasers for the purpose just described, provides what is known as a "lock-to-clock" capability to thereby provide a conventional level of timing accuracy.

FIG. 1 illustrates a known accelerator system 100. In FIG. 1, master RF oscillator 105 generates and supplies a low-frequency signal to seed laser 110. Seed laser 110 may include, for example, a mode-locked $Ti^{3+}$ doped Sapphire (Ti:S) oscillator operating at 81.6 MHz, thereby providing a train of pulses with a pulse width of around 150 fs ($1.5\times10^{-13}$ sec). The output of seed laser 110 is fed into amplifier chain 120. Together, the seed laser 110 and amplifier chain 120 form a laser system 125.

The pulses output by laser system 125 are directed, for example by mirror 130, through entrance window 135 of electron gun 140. A photocathode (not shown) within electron gun 140 is thereby stimulated to produce electrons, which are then supplied to Linear Accelerator (LINAC) 145.

Master RF oscillator 105 also generates a high-frequency signal output to high power RF amplifier 150 for use by electron gun 140 and LINAC 145. The electron gun 140 and LINAC 145 may operate in the S-band of the microwave spectrum, generally defined as within a range of 2800–3000 MHz. The high-frequency signal sent to high power RF amplifier 150 may be locked to a multiple of the low-frequency laser signal sent to seed laser 110. In the system of FIG. 1, the high frequency signal may be, for example, at a frequency of 2856 MHz, the 35th harmonic of the low-frequency signal to laser system 125. High power RF amplifier 150 and variable power splitter 155 can be used to manipulate the high-frequency output of master oscillator 105 in terms of power and direction, respectively.

Various difficulties are associated with the operation of conventional accelerator systems such as system 100 shown in FIG. 1. For example, the laser pulse should be provided to the electron gun 140 within a window of approximately 1° of phase with respect to the RF field within the electron gun 140. This correspond to about 1 ps of timing jitter and drift between the laser system 125 and the master RF oscillator 105. Because the RF field has a frequency of about 35 times the frequency of the laser system, a lock stability of about 1/35° exists on the laser system 125, which is extremely difficult to maintain.

As another example of the shortcomings of system 100, amplifier chain 120 often contributes timing drift to the system 100. Because the desired 1 ps timing window corresponds to as little as 1 part per million of the total time the pulse is propagated between the laser system 125 and the electron gun 140, even a tiny drip in the delay of the pulse through the laser system 125 can significantly degrade the timing of a pulse. This degradation can occur even if the signal applied to seed laser 110 by master RF oscillator 105 starts out perfectly timed with the phase of the electric field within a resonant cavity (not shown) of electron gun 140. For example, a 1% change in atmospheric density can easily provide this much timing drift.

A final example of problems associated with system 100 results from changes in the phase of the RF field inside the resonant cavity of the electron gun 140 relative to the phase of the RF drive supplied to the electron gun 140 by master RF oscillator 105. Such phase changes can be induced by changes in the operating temperature of the electron gun 140, for example, or changes in the transit time properties of a waveguide (not shown) to the electron gun 140 (such as could be induced by changes in the dielectric gas pressure). Thus, some variable phase may exist between the frequency of the signal supplied by master RF oscillator 105 and the frequency of the electromagnetic field present within the resonant cavity (not shown) of the electron gun 140.

An operator might monitor the output of LINAC 145, then adjust the output of master RF oscillator 105 in an attempt to obtain a desirable output from LINAC 145. However, such observations and adjustments are difficult to make, particularly in real time. Moreover, the quality of output will vary according to the skill of the operator of the system. Thus, such a method and system is not capable of providing desirable outputs on a consistent basis.

Therefore, a need exists for a method and system for easily achieving stable and predictable timing between a laser signal and an electromagnetic field(s) within an accelerator system, whereby a satisfactory output of the accelerator system itself can be easily, inexpensively and reliably obtained.

SUMMARY OF THE INVENTION

An improved method and system for synchronizing signals in a particle accelerator system is disclosed, overcoming at least the aforementioned disadvantages.

In one embodiment, a method and system is disclosed whereby phase of laser pulses are monitored, and a high-frequency signal is adjusted as necessary to be substantially in-phase with the laser pulses. In another embodiment a method and system is disclosed whereby a phase of an electromagnetic field in an electron gun is monitored, and a high-frequency signal is adjusted as necessary to be substantially in-phase with the electromagnetic field.

The features and advantages of the invention will become apparent from the following drawings and description.

BRIEF DESCRIPTION OF THE DRAWINGS

The invention is described with reference to the accompanying drawings. The left-most digit(s) of a reference number identifies the drawing in which the reference number first appears.

DETAILED DESCRIPTION

While the invention is described below with respect to various embodiments, the invention is not limited to only those embodiments that are disclosed. Other embodiments can be implemented by those skilled in the art without departing from the spirit and scope of the invention.

Figure 1:
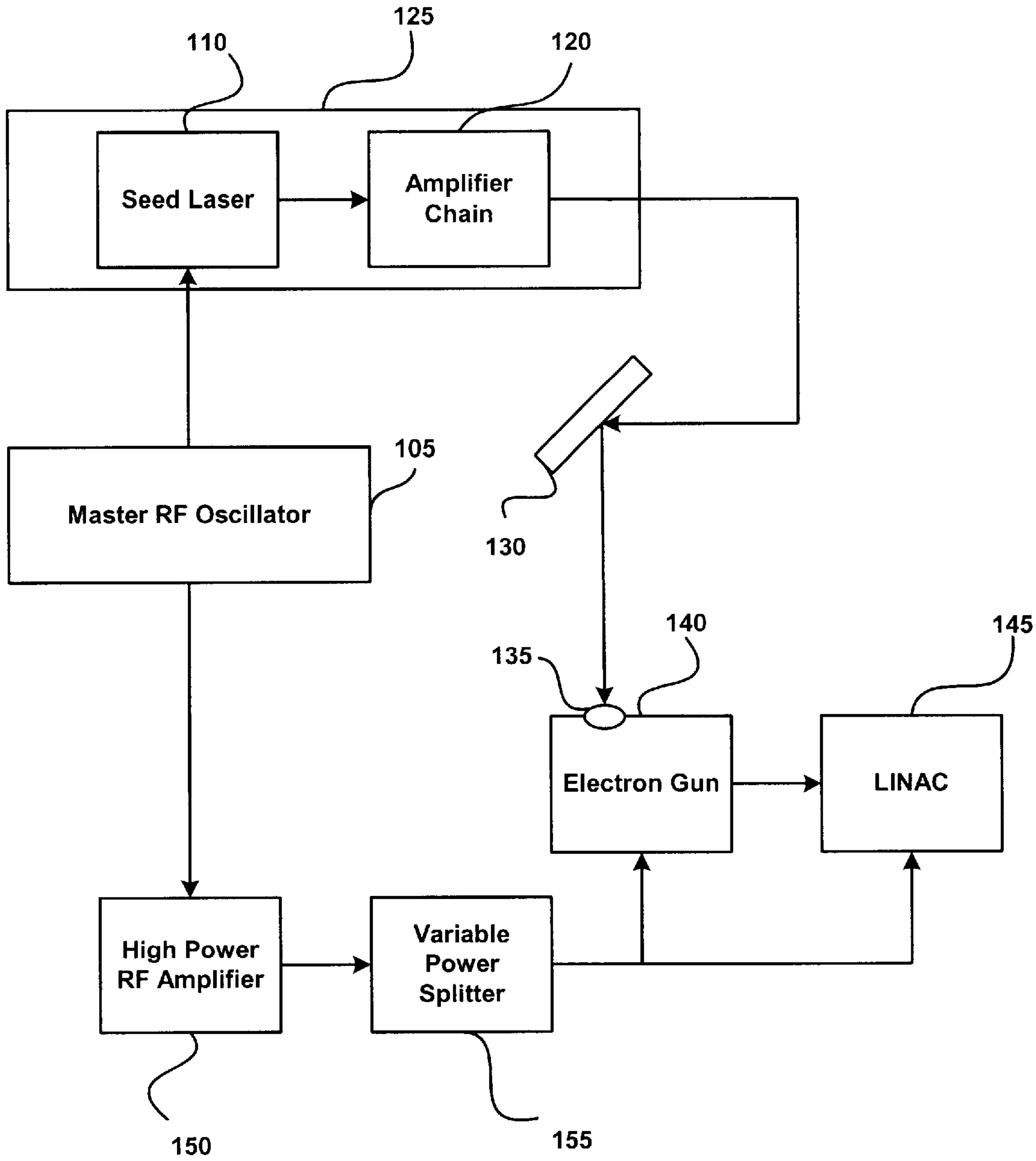
FIG. 1 illustrates a known accelerator system.
Figure 2:
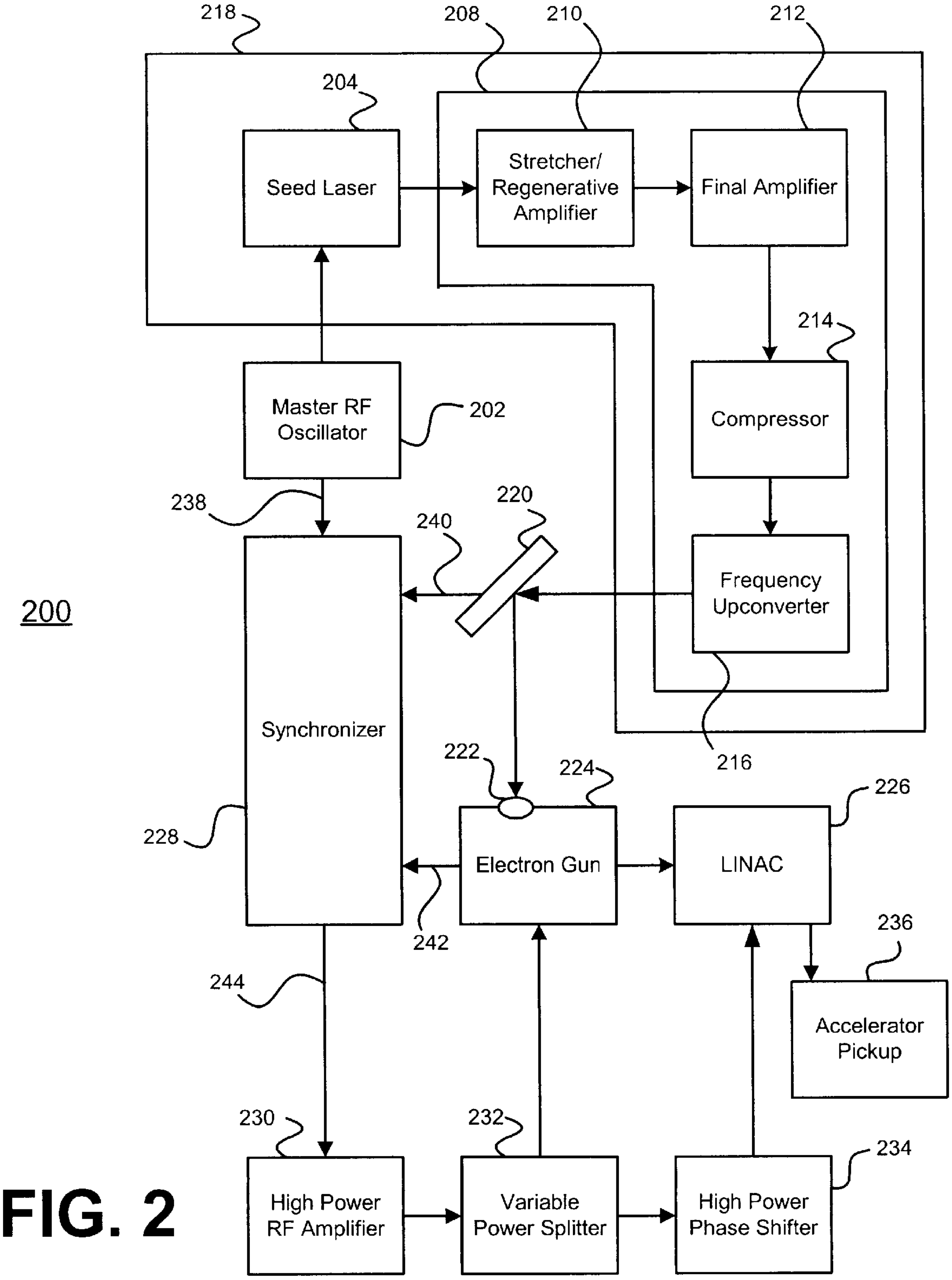
FIG. 2 illustrates an accelerator system according to one embodiment of the invention.

FIG. 2 illustrates an accelerator system 200. As shown therein, embodiments of accelerator system 200 include master RF oscillator 202, laser system 218, splitter 220, electron gun 224, LINAC 226, synchronizer 228, high power RF amplifier 230, variable power supply 232, high power phase shifter 234, and accelerator pick-up 236. Not all embodiments require all components.

In operation, the master RF oscillator 202 is coupled to the laser system 218 to provide a low-frequency excitation signal. The laser system 218 outputs a laser pulse train to electron gun 224 via splitter 220 and window 222 of electron gun 224. The master RF oscillator 202 also produces a high-frequency signal 238. The high-frequency signal 238, a signal 240 from splitter 220, and a signal 242 from an antenna pickup (not shown) monitoring electron gun 224 are optionally coupled to synchronizer 228 according to embodiments that will be described below. Synchronizer 228 generates an output signal 244,the phase of which may be adjusted with respect to the high-frequency signal 238 from master RF oscillator 202. High power RF amplifier 230 is configured to receive and amplify the output signal 244 from synchronizer 228. Variable power splitter 232 is configured to receive and direct at least a portion of the output from the high power RF amplifier 230 to the electron gun 224.

Accelerator system 200 includes high power phase shifter 234 and accelerator pickup 236. High-power phase shifter 234 is coupled to receive a signal from variable power splitter 232 and output an adjusted phase signal to LINAC. Accelerator pickup 236 monitors an RF field, or the phase of an RF field (not shown), in LINAC 226. In operation of accelerator system 200, the phase of an electromagnetic signal in electron gun 140, as monitored by an antenna (not shown), may be compared to the phase of an electromagnetic field signal in LINAC 226. The phase of the electromagnetic field signal in LINAC 226 may be provided, for example, to accelerator pickup 236. Any relative phase difference is corrected using high-power phase shifter 234 in the waveguide (not shown) providing power to LINAC 226. Note that high-power phase shifter 234 and accelerator pickup 236 are optional components. In an embodiment where high-power phase shifter 234 and accelerator pickup are not present, variable power shifter 232 can provide a signal to LINAC 226.

Laser system 218 includes a seed laser 204 and an amplifier chain 208 successively coupled as shown in FIG. 2. Amplifier chain 208 includes a stretcher/regenerative amplifier 210, a final amplifier 212, a compressor 214, and a frequency upconverter 216, also successively coupled as shown in FIG. 2.

Seed laser 204 produces a train of very low energy light pulses in the near infrared spectrum, for example at a frequency of approximately 80 MHz. Stretcher/regenerative amplifier 210 selects from this train a lower frequency train at around 1 kHz and amplifies this subset to a much higher energy level. Final amplifier 212, compressor 214, and frequency upconverter 216 produce a few Hz train of pulses in the ultraviolet spectrum to drive a photocathode (not shown) of electron gun 224.

Final amplifier 212 is optionally powered. Thus, the output of final amplifier 212 may consist of both low-power pulses and high-power pulses. The low-power pulses in the train are provided as mixed compressed pulses at the output of amplifier chain 208, and are directed by splitter 220 to synchronizer 228 as signal 240.

Figure 3A:
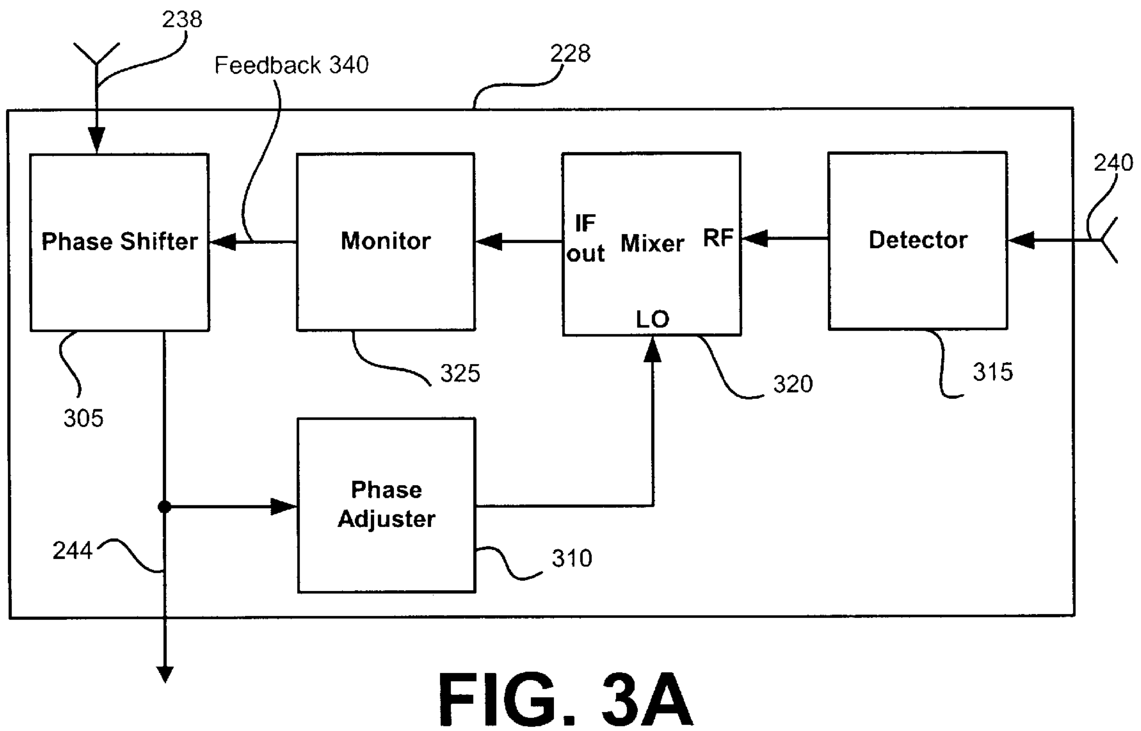
FIG. 3A illustrates a first embodiment of the synchronizer shown in FIG. 2.

FIG. 3A illustrates a first embodiment of synchronizer 228. As shown therein, synchronizer 228 includes phase shifter 305, phase adjuster 310, detector 315, mixer 320, and monitor 325. In this embodiment, the phase of output signal 244 is adjusted by phase shifter 305 to approximate the phase of input signal 240.

In operation, optical detector 315, which may be or include for example a very fast photodiode, is used to measure the arrival time of a laser pulse in signal 240. Detector 315 sends arrival time measurements to mixer 320. Mixer 320 compares the arrival time measurements to the timing of a signal derived from RF clock signal 244, which is received at a local oscillator (LO) input of mixer 320. The output of mixer 320 is monitored via monitor 325. The phase of RF clock signal 244 is then adjusted via manual or automatic feedback 340 to provide synchronization with laser pulse signal 240.

Mixer 320 may be, for example, a double-balanced-mixer (DBM). In another embodiment, mixer 320 may be a single-pulse four-quadrant multiplier. Mixer 320 produces a series of pulses, one for each incoming laser pulse, at an intermediate frequency (IF) output. The shape of the pulse can be approximated by $v(t)=I(t-t_o)\sin(2\pi ft)$, where f is the frequency of the RF clock signal 244 and $t_o$ is the time offset of the optical pulse with respect to the signal at the LO input of mixer 320. Optimal timing occurs when the pulse from detector 315 arrives at mixer 320 at the zero crossing of the LO signal to mixer 320. In the illustrated embodiment, this is accomplished via RF phase adjuster 310 disposed in the path of the RF clock signal 244.

RF phase adjuster 310 may be or include a trombone adjuster. Monitor 325 may optionally be or include, for example, an oscilloscope, an analog-to-digital converter (ADC), a sample-and-hold circuit, and a proportional/integral (PI) control. Phase shifter 305 may be, for example, a Positive Intrinsic Negative (PIN) diode phase shifter.

Figure 3B:
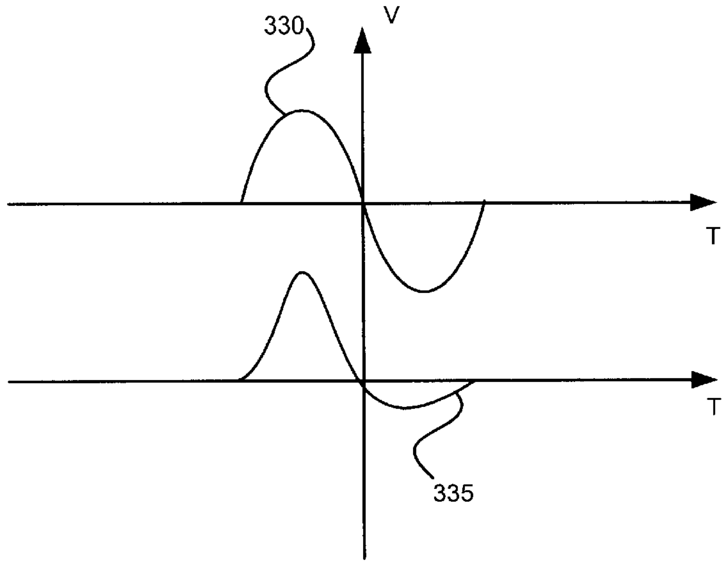
FIG. 3B illustrates the output characteristics of the mixer shown in FIG. 3A.

FIG. 3B illustrates voltage v. time curves for signals at the output of mixer 320. When the laser pulse arrives at the zero-crossing, the IF output of mixer 320 seen at monitor 325 is a small, symmetrical sinusoidal monocycle 330. When the laser is not timed correctly, the output of the mixer 320 seen at monitor 325 is a much larger, asymmetrical pulse 335, with the sign and magnitude of the asymmetry indicating the sign and magnitude of the timing error. The simplest stabilization, then, depends only on keeping this timing output symmetrical, and is not dependent on careful measurement of the amplitude or timing of the pulse. This can be accomplished by monitoring the shape of the IF output signal with monitor 325, and adjusting the phase of RF clock signal 244 using phase shifter 305. The various embodiments of monitor 325 enable various manual and automatic adjustments to phase shifter 305 as will be described below. By comparing the low-level train signal 240 to a signal derived from the continuous-wave (CW) RF clock signal 238, a large number of phase-correction pulses may be obtained between each pulse of laser system 218, allowing the phase to be monitored via monitor 325 and corrected via phase shifter 305 in nearly real time. This approach advantageously reduces the need for a high degree of long-term stability in master RF oscillator 202 and laser system 218.

Figure 4A:
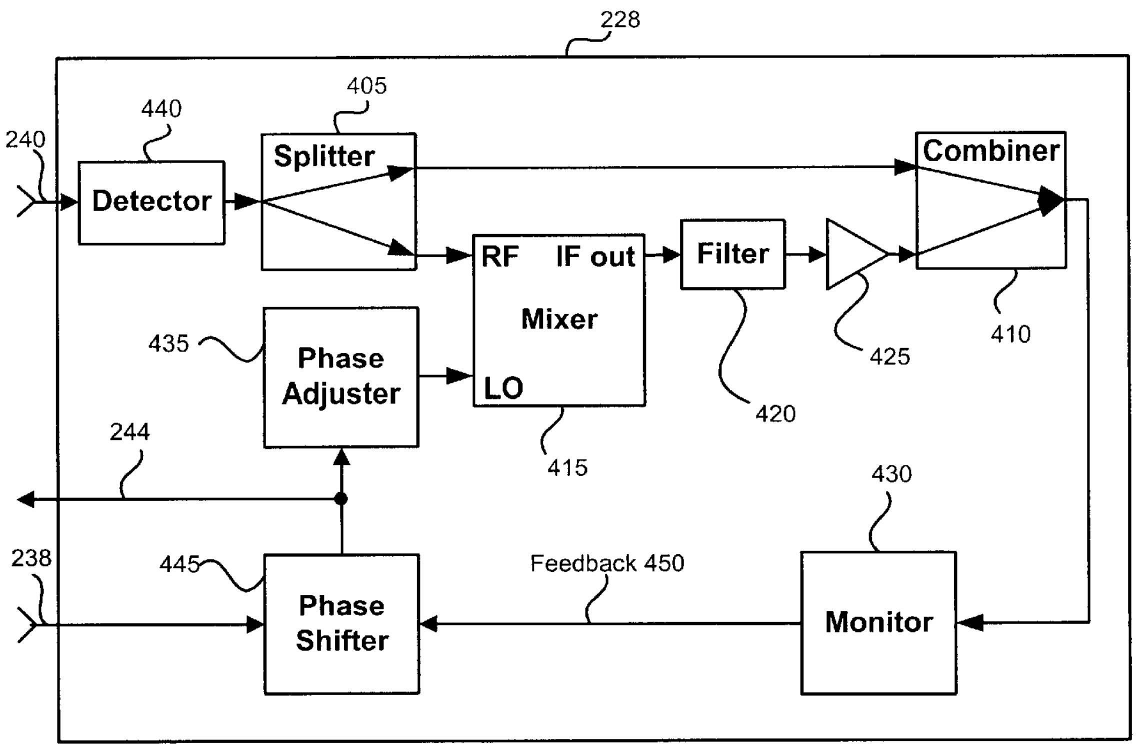
FIG. 4A illustrates a second embodiment of the synchronizer shown in FIG. 2.

FIG. 4A illustrates a second embodiment of synchronizer 228. As shown therein, synchronizer 228 includes detector 440, splitter 405, combiner 410, mixer 415, filter 420, amplifier 425, monitor 430, phase shifter 445, and phase adjuster 435. Detector 440 measures the arrival time of a laser pulse in signal 240. Splitter 405 is coupled to receive the time measurement from detector 440, splitting the signal into two paths.

A first output of splitter 405 is coupled to combiner 410 to produce a trigger pulse from combiner 410. A second output from splitter 410 is coupled to an RF input of mixer 415. RF clock signal 238 is coupled to an LO input of mixer 415 via phase shifter 445 and phase adjuster 435, as shown. Mixer 415 outputs a signal to the series combination of filter 420 and amplifier 425. The output of amplifier 425 is provided to combiner 410, producing a phase pulse from combiner 410. Monitor 430 inspects the trigger and phase pulses from combiner 410, and feedback 450 enables an adjustment to the phase of signal 244 via phase shifter 445. Accordingly, a series of phase adjustments can be made to signal 244 based on a series of laser pulses in signal 240.

Filter 420 may be or include, for example, a low-pass filter to reduce the bandwidth of the phase pulse and simplify subsequent monitoring. Amplifier 425 boosts the signal received from filter 420 to compensate for loss of amplitude in filter 420.

Figure 4B:
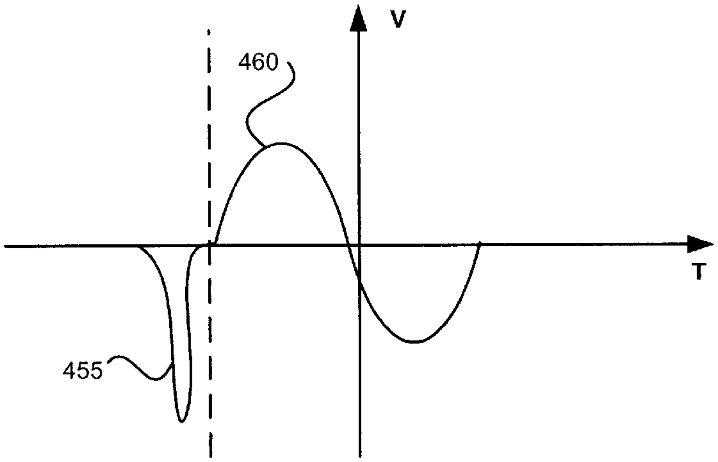
FIG. 4B illustrates the output characteristics of the combiner shown in FIG. 4A.

FIG. 4B illustrates the voltage vs. time characteristic of the signal output from combiner 410 as measured in monitor 430. As shown therein, the signal advantageously includes both a clean trigger pulse 455 and a phase pulse 460, simplifying the implementation of the synchronization process.

Figure 5:
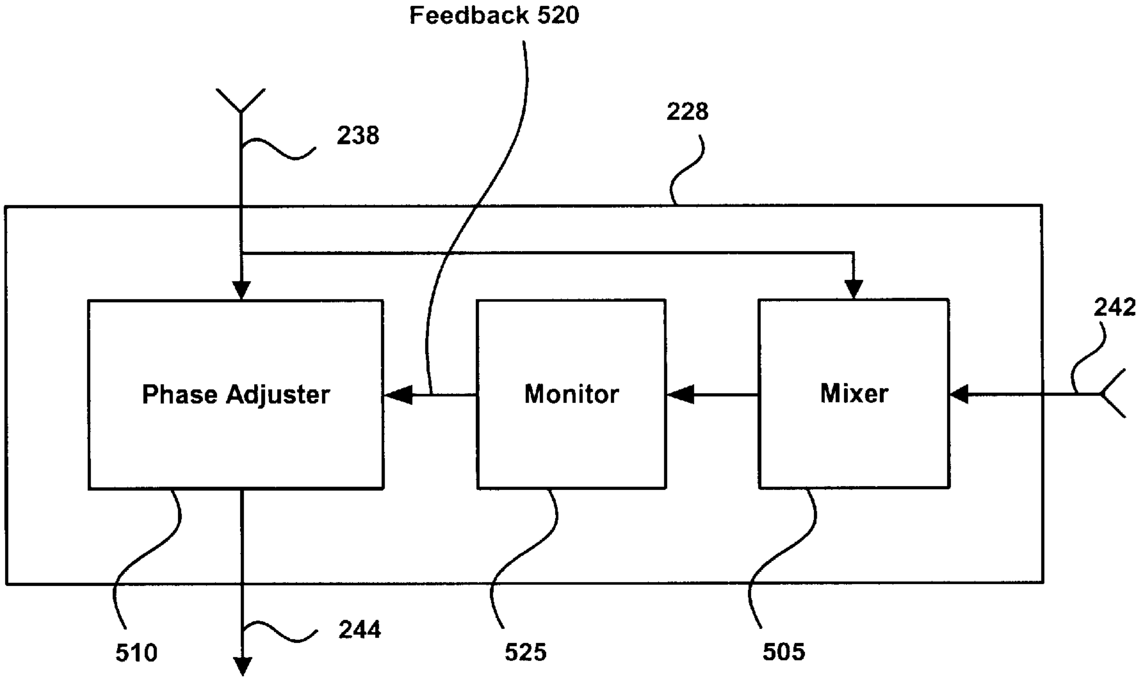
FIG. 5 illustrates a third embodiment of the synchronizer shown in FIG. 2.

FIG. 5 illustrates a third embodiment of synchronizer 225. As shown therein, synchronizer 228 includes a mixer 505, monitor 525 and a phase adjuster 510 coupled in series. In this embodiment, mixer 505 receives signal 242 from an antenna (not shown) monitoring an electromagnetic field in electron gun 224. Mixer 505 also receives an RF clock signal 238 from master RF oscillator 202. The output of mixer 505 is measured at monitor 525, and phase adjuster 510 determines the phase of signal 244 based on feedback 520. Thus, the third embodiment of synchronizer 228 enables correction of phase shift between a RF clock signal 238 and the electromagnetic field in electron gun 224 caused by temperature shifts or other factors.

Combinations of the first, second, and third embodiments of synchronizer 228 described above may be advantageous to provide even more precise synchronization. For example, in combining the first and third embodiments to compensate for delays in both the low frequency laser and high-frequency RF chains, synchronizer 228 includes the components illustrated in FIGS. 3A and 5, and the output of phase shifter 305 is input to phase adjuster 510 in lieu of signal 238.

Feedback in the various embodiments of synchronizer 228 described above can be performed in at least the following ways:

as an open-loop monitor of phase, using an oscilloscope to verify the symmetry of the waveform, and manual adjustment of the system phase to correct it;

in a closed feedback loop, where the waveform is monitored digitally on an oscilloscope, and read into software, where the phase corrections are mode;

in a closed, digital feedback loop, where the integral of the output pulse is captured by an analog-to-digital (A/D) converter, and the resulting digital value is passed back either directly to a phase shifter or via software to make the needed correction; or, in a closed analog feedback loop, where the integral of the output pulse is held in a sample-and-hold circuit, and then applied to a proportional/integral (PI) control loop to stabilize the phase.

In the first two of these feedback methods, the stabilization is carried out based on the shape of the waveform, and it may be appropriate to use a fairly high-bandwidth monitor (at least a few hundred MHz). This is because the monitored signal is a very fast monocycle, and reducing the bandwidth will greatly reduce its amplitude.

In the last two feedback methods, instead of using the shape of the waveform, the system uses the integral of the phase pulse. When the pulse is symmetrical, this integral is zero. When the pulse is asymmetrical, the integral is either positive or negative, depending on the sign of the asymmetry. It may be desirable to pass this pulse through a DC-blocking filter to avoid drift from DC level shifts in mixers 320, 415 or 505 as shown in FIGS. 3A, 4A or 5, respectively. If this is done, of course, the integral over all time of the output will be zero. In the region of time around the pulse, however, a net DC value exists. Thus, using a gated integrator which integrates a few nanosecond region around the pulse allows for recovery of the necessary DC information for phase stabilization. Note that because the actual pulse width produced is very short (e.g., a few ns), and the interval between pulses is very long (e.g. a few ms), the sample-and-hold system and integrators used to monitor this pulse are preferably high-precision components. The third feedback method listed above achieves the hold by digitizing substantially immediately the short-term integral of the pulse. This method should not be subject to drift.

Various bandwidth considerations exist for the above-described embodiments of synchronizer 228. For example, DBM's may be used in a mode for which they are not well characterized. Normally, the parameters specified are an RF bandwidth, an LO bandwidth, and an IF bandwidth. The DBM is able to function as a four-quadrant multiplier with sufficient bandwidth to process the pulse from the optical detector. Also, the speed of the detector can affect the amplitude of the signal produced by this device.

For example, assuming the detector produces a Gaussian pulse $I(t)=I_o\exp[-(t-t_o)^2/(2\sigma^2)]$ and the DBM multiplies it by a carrier $z(t)=\sin(2\pi ft)$, then the output will be the band-limited product of these two. The Fourier transform of the optical pulse is also a Gaussian, of the form $I(\omega)\epsilon\exp(-\omega^2\sigma^2/2)\sin(\omega t_o)$. For the purposes of this discussion, the only important part of this is the exp factor, because the sin factor is an artifact of the pulse not being centered at t=0. This factor sets a reasonable scale for the bandwidth recommended to represent the pulse: if $\omega\sigma>>1$, the system has sufficient bandwidth. Thus, for a 4000 MHz DBM bandwidth, $\sigma=100$ ps may be about the narrowest pulse useful to the system.

It is also appropriate to examine the output amplitude as a function of the input pulse width and the carrier frequency to see what effect the pulse width has on the sensitivity of the system. For a given carrier angular frequency $\omega_o$, and a pulse width sigma at time offset $t_o$, the integral of the output voltage, such as might be used by a sample-and-hold system for feedback, is proportional to $\sigma\exp(-\sigma^2\omega_0^2/2)\sin(\omega_o t_o)$. Again, the recommendation is that $\omega_{o\sigma<}1$ for best sensitivity. For a 2856 MHz carrier, $\omega_0=2\pi f=1.8\times11^{10}$. Thus, for optimal sensitivity, it is recommended that $\sigma$ is not many times larger than 50 ps. This is reasonably consistent with the 100 ps minimum useful pulse width set by a 4000 MHz bandwidth DBM. Such a signal is quite robust, no strong need exists to use a faster, more expensive DBM.

While this invention has been described in various explanatory embodiments, other embodiments and variations can be effected by a person of ordinary skill in the art without departing from the scope of the invention. For example, using the above-described techniques, phase adjustments can be manually inputted into an accelerator system, in an easy and reliable manner. Alternatively, software can be use to make phase adjustments automatically.

What is claimed is:

1. A method for synchronizing a high-frequency signal to a plurality of laser pulses, the method comprising:

amplifying an output of a pumped, mode-locked laser to produce the laser pulses;

comparing a phase of the laser pulses with a phase of the high-frequency signal; and adjusting a phase shifter outputting the high-frequency signal such that the high-frequency signal is substantially in phase with the laser pulses.

2. The method of claim 1, wherein said comparing further comprises:

receiving the laser pulses at a detector;

receiving a detector output at a mixer; and receiving the high-frequency signal at the mixer via the phase shifter.

3. The method of claim 2, wherein said adjusting further comprises:

detecting a comparison signal output by the mixer; and adjusting the phase shifter such that the comparison signal indicates a phase match between the high-frequency signal and the laser pulses.

4. The method of claim 2, further comprising:

splitting the detector output into a first detector output and a second detector output;

inputting the first detector output into the mixer;

inputting the second detector output into a combiner;

filtering an output of the mixer to remove low-frequency components;

combining the first detector output and the filtered mixer output at the combiner to produce a comparison signal; and adjusting the phase shifter such that the comparison signal indicates a phase match between the high-frequency signal and the laser pulses.

5. The method of claim 4, wherein said adjusting further comprises processing the comparison signal electronically using the first detector output as a trigger signal.

6. The method of claim 2, wherein the mixer is a double-balanced mixer configured as a single-pulse four-quadrant multiplier.

7. The method of claim 1, further comprising:

receiving the high-frequency signal at a photocathode electron gun; and initiating electron generation within the photocathode electron gun with the laser pulses.

8. The method of claim 7, further comprising:

detecting a phase of an electromagnetic field within a resonant cavity of the photocathode electron gun;

comparing the electromagnetic field phase to the high-frequency signal; and adjusting the high-frequency signal to be in phase with the electromagnetic field phase.

9. The method of claim 8, further comprising:

receiving an electron beam produced by the photocathode electron gun at an accelerator;

detecting an accelerator electromagnetic field phase within the accelerator;

comparing the accelerator electromagnetic field phase to the high-frequency signal; and adjusting the high-frequency signal to be in phase with the accelerator electromagnetic field phase.

10. The method of claim 1, wherein said comparing further comprises:

comparing the phase of the high-frequency signal to the phase of the laser pulses to produce a displayed signal at an oscilloscope; and monitoring a symmetry of the displayed signal.

11. The method of claim 10, wherein said adjusting further comprises:

receiving the displayed signal at a software program; and adjusting automatically at the software program the phase of the high-frequency signal based on the displayed signal.

12. The method of claim 1, said comparing producing a result signal, said comparing further comprising:

determining an integral of the result signal;

receiving the integral at an analog-to-digital converter; and outputting a digital value to the phase shifter upon which said adjusting is based.

13. The method of claim 1, said comparing producing a result signal, said comparing further comprising:

determining an integral of the result signal;

receiving the integral in a sample-and-hold circuit;

applying the integral to a phase control loop; and stabilizing the phase of the high-frequency signal based on an operation of the phase control loop.

14. A method for operating a laser-initiated system associated with a drive signal, the method comprising:

monitoring a phase and a frequency of a chain of laser pulses entering the system;

comparing the phase of the chain of laser pulses to a clock signal associated with the drive signal, the clock signal being a harmonic of the frequency of the chain of laser pulses; and altering the clock signal such that the drive signal is substantially in phase with the phase of the chain of laser pulses.

15. The method of claim 14, wherein said comparing further comprises:

receiving the chain of laser pulses at a detector;

receiving a detector output at a mixer;

receiving the clock signal at a phase shifter; and outputting the drive signal from the phase shifter into a mixer.

16. The method of claim 15, wherein said altering further comprises:

detecting a comparison signal output by the mixer; and adjusting the phase shifter such that the comparison signal indicates a phase match between the drive signal and the chain of laser pulses.

17. The method of claim 15, further comprising:

splitting the detector output into a first detector output and a second detector output;

receiving the first detector output at the mixer;

receiving the second detector output at a combiner;

filtering an output of the mixer to remove low-frequency components;

combining the first detector output and the filtered mixer output at the combiner; and adjusting the phase shifter such that a comparison signal output by the combiner indicates a phase match between the drive signal and the chain of laser pulses.

18. The method of claim 15, wherein the mixer comprises a double-balanced mixer configured as a single-pulse four-quadrant multiplier.

19. The method of claim 14, further comprising:

receiving the drive signal at a photocathode electron gun within the laser-initiated system; and initiating electron generation within the photocathode electron gun with the chain of laser pulses.

20. The method of claim 19, further comprising:

detecting a phase of an electromagnetic field within a resonant cavity of the photocathode electron gun;

comparing the electromagnetic field phase to the clock signal; and adjusting the clock signal to be in phase with the electromagnetic field phase.

21. The method of claim 14, said comparing producing a result signal, said comparing further comprising:

determining an integral of the result signal;

receiving the integral at an analog-to-digital converter; and outputting a digital value, upon which said altering operation is based, to the phase shifter.

22. A system for synchronizing an electromagnetic field with a pulsed laser output, the system comprising:

a photodetector operable to detect the pulsed laser output and output a detector output;

a mixer coupled to the photodetector, the mixer operable to receive and compare the detector output and a first clock signal; and a phase adjuster coupled to the mixer and receiving the first clock signal, the phase adjuster operable to alter the first clock signal into a second clock signal substantially in phase with the pulsed laser output, based on a comparison signal output by the mixer.

23. The system of claim 22, further comprising:

a splitter coupled to the photodetector, the splitter operable to split the detector output into a first detector output for inputting into the mixer and a second detector output;

a combiner coupled to the splitter, the combiner operable to receive the second detector output; and a filter coupled to the mixer, the filter operable to remove low-frequency elements of the comparison signal and output a remainder of the comparison signal to the combiner.

24. The system of claim 23, further comprising an oscilloscope coupled to the combiner, the oscilloscope operable to process the remainder of the comparison signal electronically using the first detector output as a trigger signal.

25. The system of claim 22, wherein the mixer comprises a double-balanced mixer operated as a single-pulse four-quadrant multiplier.

26. The system of claim 22, wherein the second clock signal determines a phase of the electromagnetic field.

27. The system of claim 26, wherein the electromagnetic field propagates within a resonant cavity of a photocathode electron gun.

28. The system of claim 27, wherein the photocathode electron gun is coupled to the phase adjuster and receives the second clock signal.

29. The system of claim 28, wherein the photocathode electron gun receives the pulsed laser output to initiate electron generation.

30. The system of claim 29, further comprising:

an antenna coupled to the photocathode electron gun, the antenna operable to detect a phase of the electromagnetic field; and a phase-comparing circuit operable to input the first clock signal and the electromagnetic field phase and output a third clock signal, the third clock signal substantially in phase with the electromagnetic field phase.

31. The system of claim 29, further comprising:

an antenna coupled to an accelerator, the accelerator inputting an electron beam generated by the photocathode electron gun, the antenna operable to detect an accelerator electromagnetic field phase of an accelerator electromagnetic field within the accelerator; and a second phase-comparing circuit operable to input the third clock signal and the accelerator electromagnetic field phase and output a fourth clock signal, the fourth clock signal substantially in phase with the accelerator electromagnetic field phase.

32. The system of claim 22, further comprising an oscilloscope coupled to the mixer, the oscilloscope operable to receive the comparison signal and display a comparison of a phase of the first clock signal and a phase of the pulsed laser output.

33. The system of claim 32, further comprising a computer storing a software program, the computer coupled to the oscilloscope and to the phase adjuster, the software program operable to adjust automatically the phase of the first clock signal based on the comparison signal.

34. The system of claim 32, further comprising an analog-to-digital converter coupled to the oscilloscope, the analog-to-digital converter operable to capture an integral of the comparison signal and output a corresponding digital value to the phase adjuster.

35. The system of claim 32, further comprising:

a sample-and-hold circuit coupled to the oscilloscope, the sample-and-hold circuit operable to hold an integral of the comparison signal; and a phase control loop including the sample-and-hold circuit and the phase adjuster, the phase control loop operable to input the integral and stabilize a phase of the second clock signal based thereon.

36. A system for synchronizing a pulsed laser output and an electromagnetic field, the system comprising:

a detector, the detector configured to receive the pulsed laser output and output a detector output signal;

a frequency generator operable to generate a clock signal;

a phase-comparing device coupled to the detector, the phase-comparing device operable to receive the clock signal and the detector output signal and output a comparison signal; and a phase-adjusting device coupled to the frequency generator and the phase-comparing device, the phase-adjusting device operable to input the clock signal and output an electromagnetic field drive signal based on the comparison signal and substantially in phase with the detector output signal.

37. The system of claim 36, further comprising:

a splitter coupled to the detector, the splitter operable to split the detector output into a first detector output and a second detector output, the first detector output received at the phase-comparing device;

a combiner coupled to the splitter, the combiner operable to receive the second detector output; and a filter coupled to the phase-comparing device, the filter operable to remove low-frequency elements of the comparison signal and output a remainder of the comparison signal to the combiner.

38. The system of claim 37, further comprising an oscilloscope coupled to the combiner, the oscilloscope operable to process the remainder of the comparison signal electronically using the first detector output as a trigger signal.

39. The system of claim 36, wherein the phase-comparing device comprises a double-balanced mixer configured as a single-pulse four-quadrant multiplier.

40. The system of claim 36, further comprising a photocathode electron gun coupled to the phase adjuster and receiving the electromagnetic field drive signal, the photocathode electron gun further receiving the pulsed laser output to initiate electrons being generated based on the pulsed laser output.

41. The system of claim 40, further comprising:

an antenna coupled to the photocathode electron gun, the antenna operable to detect an electromagnetic field phase of an electromagnetic field within a resonance cavity of the photocathode electron gun; and a second phase-comparing circuit operable to input the electromagnetic field drive signal and the electromagnetic field phase and output an altered electromagnetic field drive signal, the altered electromagnetic field drive signal being substantially in phase with the electromagnetic field phase.

42. The system of claim 36, further comprising an oscilloscope coupled to the phase-comparing device, the oscilloscope operable to receive the comparison signal and display a comparison of a phase of the clock signal and a phase of the pulsed laser output.

43. The system of claim 42, further comprising a computer storing a software program, the computer coupled to the oscilloscope and to the phase adjuster, the software program operable to adjust automatically the phase of the clock signal based on the comparison signal.

44. The system of claim 42, further comprising an analog-to-digital converter coupled to the oscilloscope, the analog-to-digital converter operable to capture an integral of the comparison signal and output a corresponding digital value to the phase-adjusting device.

45. A system for defining a system clock, the system comprising:

a laser system driven by a laser clock, the laser system outputting a chain of laser pulses in relation to the laser clock; means for detecting a timing of the chain of laser pulses; and means for setting the system clock, the means for setting the system clock receiving the timing of the chain of laser pulses and defining the system clock in synchronization therewith.

46. The system of claim 45, further comprising a subsystem driven by the system clock, the operation of the subsystem being initiated by the chain of laser pulses.

* * * * *